No. 615,957. Patented Dec. 13, 1898.
M. F. BROWN.
COOKING UTENSIL.
(Application filed Aug. 21, 1897.)
(No Model.)
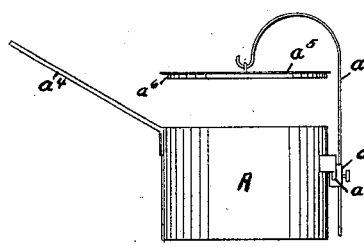 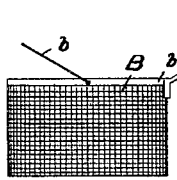 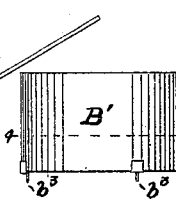 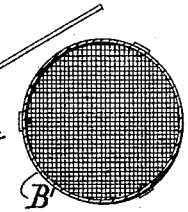
FIG. 1. FIG. 2. FIG. 3. FIG. 4.
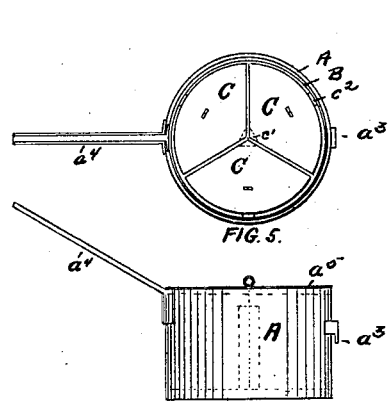 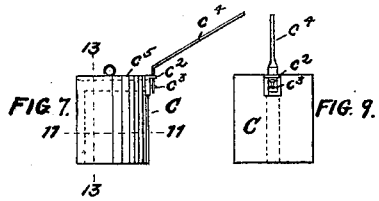 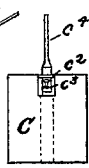 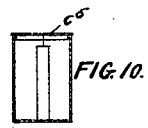
FIG. 5. FIG. 7. FIG. 9. FIG. 10.
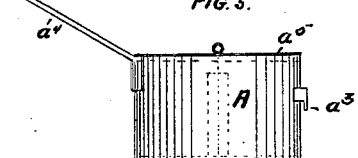 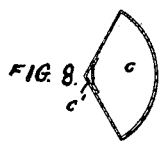
FIG. 6. FIG. 8.
Witnesses
B. E. Hamrick
Brayton G. Richards
Inventor
Millard F. Brown

UNITED STATES PATENT OFFICE.

MILLARD F. BROWN, OF KANSAS CITY, MISSOURI.

COOKING UTENSIL.

SPECIFICATION forming part of Letters Patent No. 615,957, dated December 13, 1898.

Application filed August 21, 1897. Serial No. 649,054. (No model.)

*To all whom it may concern:*

Be it known that I, MILLARD F. BROWN, a citizen of the United States, residing at Kansas City, in the county of Jackson and State of Missouri, have invented certain new and useful Improvements in Cooking Utensils, of which the following is a specification.

My invention relates to that class of cooking utensils in which the foods are cooked in receptacles surrounded by hot or boiling water; and my invention consists of the combination and arrangement of parts hereinafter set forth and claimed.

In the drawings, Figure 1 is an elevation of an outer boiler; Fig. 2, an elevation of a perforated inner receptacle; Fig. 3, an elevation of a modified form of inner receptacle; Fig. 4, a section on line 4 4 of Fig. 3. Figs. 5 and 6 are a plan and elevation, respectively, of a cooking utensil embodying my invention; Fig. 7, a side elevation of a stew-pan; Fig. 8, a section on line 11 11 of Fig. 7; Fig. 9, a rear elevation of a stew-pan; Fig. 10, a section on line 13 13 of Fig. 7.

A represents an outer boiler; B, a perforated inner receptacle adapted to fit into A; C, stew-pans which fit into B.

The stew-pans C are preferably substantially wedge-shaped in cross-section, with an angle at the apex of about one hundred and twenty degrees, so that three of them will fit simultaneously into the receptacle B. They consist, preferably, of a large compartment $c$, closed at the bottom, in which the food to be cooked is placed, and a smaller compartment or channel $c'$, situated in the apex, both ends of which are left open. The partition which separates these compartments does not extend all the way to the top of the stew-pan, so that the upper portions of the compartments are in communication when the lid is in place. As the lower end of the channel $c'$ is open and the upper end is in communication with the food-compartment $c$, when two or more of the pans are placed in the same vessel of heated or boiling water the food-compartment in each is in communication with the surrounding water, but is not in communication with the other. Thus the food in each pan receives the benefit of the steam and radiated heat from the heated water in the outer boiler without being contaminated by the vapors arising from the foods in the different pans. Each pan is provided with an eye $c^2$ and button $c^3$, by means of which the detachable handle $c^4$ may securely engage it. A lid $c^5$ completely covers each pan.

Having placed food in one or more of the stew-pans C, these are placed in the receptacle B, which is then placed in the outer boiler A. The outer boiler A is preferably provided with an adjustable arm $a$, from which the receptacle B is supported by means of bail $b$. Thus when the arm $a$ is properly adjusted the receptacle B hangs clear of the bottom of the boiler A and the danger of burning the food by contact with the bottom of A is obviated. I render the arm $a$ adjustable by mounting it loosely in a socket in a clamp $a'$. A suitable set-screw serves to secure it in any desired position. The clamp $a$ is attached to a lip or downwardly-projecting flange $a^3$ on boiler A by means of a suitable set-screw.

The receptacle B is preferably made of wire gauze or netting throughout, with a supporting-rim $b^2$ at the top, as shown in Fig. 2; but in Figs. 3 and 4 I have shown a modified form B'. In this form the sides are solid, only the bottom being composed of wire-gauze, and it is provided with legs $b^3$. These legs serve to keep the stew-pans clear of the bottom of the boiler A. This feature of my invention is capable of many modifications without departing from its spirit. A mere wire mat would serve to keep the stew-pans clear of the bottom of the boiler; but this would be inconvenient, since then all of the stew-pans could not be placed in or removed from the boiler at the same time.

The outer boiler A is designed to rest directly on the stove and may be of any of the well-known types. It is preferably provided with the lip $a^3$, to which the clamp $a'$ may be attached. Its handle $a^4$ is concave on its upper side to receive the handle of B', which is designed to closely fit $a^4$. The lid $a^5$ has its rim cut away at $a^6$ on the side toward the handles to permit the handle of B' to pass through. This permits the stew-pans to be completely covered after they have been placed in position in A, preventing unnecessary radiation of heat and escape of steam.

I claim—

1. The combination, in a cooking utensil, of an outer boiler; a perforated inner receptacle; means for supporting the perforated inner receptacle clear of the bottom of the outer boiler; two or more covered stew-pans, adapted to fit into the inner receptacle and open connections between the upper portion of each stew-pan and the water in the outer boiler, substantially as and for the purpose set forth.

2. The combination in a cooking utensil of an outer boiler, an inner receptacle with a perforated bottom and provided with legs, three substantially wedge-shaped covered stew-pans adapted to fit into the inner receptacle simultaneously and open connections between the upper portion of each of the stew-pans and the water in the outer boiler, substantially as and for the purpose set forth.

3. The combination in a cooking utensil of the outer boiler, A, the inner receptacle, B, the three substantially wedge-shaped stew-pans, C, each provided with a separate cover, $c^5$, and comprising the two compartments, $c$ and $c'$, the latter being open and extending below the surface of the water in the outer boiler, substantially as and for the purpose set forth.

MILLARD F. BROWN.

Witnesses:
   B. E. HAMRICK,
   BRAYTON G. RICHARDS.